US005091078A

United States Patent [19]

Ogawa

[11] Patent Number: 5,091,078

[45] Date of Patent: Feb. 25, 1992

[54] OIL FILTRATION CIRCUIT FOR A BELT-TYPE TRANSMISSION

[75] Inventor: Masahiro Ogawa, Shizuoka, Japan

[73] Assignee: Suzuki Jidosha Kogyo Kabushiki Kaisha, Shizuoka, Japan

[21] Appl. No.: 588,602

[22] Filed: Sep. 26, 1990

[30] Foreign Application Priority Data

Sep. 30, 1989 [JP] Japan .................................. 1-256407

[51] Int. Cl.[5] .................................................. F01M 1/00

[52] U.S. Cl. .................................. 210/168; 210/416.5; 210/435; 74/467; 74/606 R

[58] Field of Search ............ 210/168, 171, 172, 416.5, 210/435; 184/6.24, 6.28; 74/467, 606 R

[56] References Cited

U.S. PATENT DOCUMENTS 2,767,736 10/1956 Lackinger ........................... 210/168
4,369,675 1/1983 Van Deursen ......................... 74/864
4,889,621 12/1989 Yamada et al. ........................ 74/467

*Primary Examiner*—W. Gary Jones
*Assistant Examiner*—Matthew O. Savage
*Attorney, Agent, or Firm*—Flynn, Thiel, Boutell & Tanis

[57] ABSTRACT

A transmission includes a case having first and second case portions, an oil pump supported on the first case portion and a valve body supported on the second case portion. The valve body regulates the pressure of the oil discharged by the oil pump. The oil pump is provided with a pump manifold, and the manifold includes a filter which filters oil stored in an oil pan beneath the transmission. An oil intake passage is provided in the pump manifold, a starting end of the oil intake passage communicating with the oil pan, and a terminating end of the oil intake passage communicating with the oil pump through the filter. The pump manifold also includes an oil feed passage for feeding oil from the oil pump to the valve body, and an oil return passage for returning clean surplus oil from the valve body into the oil intake passage downstream of the filter.

2 Claims, 4 Drawing Sheets

OIL FILTRATION CIRCUIT FOR A BELT-TYPE TRANSMISSION

FIELD OF THE INVENTION

This invention relates to an oil passage of a transmission, and particularly to an oil passage of a transmission capable of, for example, effectively utilizing oil which has been filtered, and in which the height of the transmission can be lowered and the strength of the transmission can be enhanced.

BACKGROUND OF THE INVENTION

Vehicles such as automobiles are equipped with a transmission in order to convert driving force generated by the engine to a required form depending on the traveling state of such vehicle. There are various types of transmissions such as gear type, torque converter type and belt type. For example, in the belt type transmission, in order to convert engine driving force to a desired form by continuously varying the transmission gear ratio and taking off the same, the transmission, as shown in FIG. 10, is provided with an oil pump 102 driven by the engine (not shown), and a valve body 104 for regulating oil discharged by this oil pump 102 to a predetermined pressure level. The oil pump 102 is provided with an oil intake passage 112, a starting end of which communicates with the interior of an oil pan 106 and a terminating end of which communicates with an intake passage 110 of the oil pump 102 through a filter 108. An oil feed passage 116 has a starting end which communicates with a discharge passage 114 of the oil pump 102 and a terminating end which communicates with the valve body 104.

Owing to the foregoing arrangement, the valve body 104 feeds oil, which has been regulated to a predetermined pressure level, to a required return oil feed part of a transmission (not shown) and returns surplus oil, which is generated when the oil is regulated to the predetermined pressure level, to the oil pan 106.

However, since the oil feed passage 116 of the conventional transmission returns surplus return oil, which has already been filtered, this clean return oil is mixed in the oil pan 106 with oil which is not yet filtered. Furthermore, the oil pump is required to again pump this clean return oil through the filter 108.

Because of the foregoing, the filtered oil cannot be effectively utilized and the oil pump work becomes heavy, causing an undesirable increase in pump driving torque. Furthermore, because bubbles are generated in the clean oil returned from the valve body 104, there arise inconveniences such as deterioration of pumping efficiency and generation of noises. Moreover, because the clean return oil is caused to pass through the filter again, the quantity of oil passing through the filter becomes large. As a result, it is necessary to increase the filter area, causing the overall apparatus to be large.

Furthermore, since the oil feed passage 116 for feeding oil to the valve body 104 from the oil pump, and the oil return passage for returning the surplus clean return oil from the valve body, are separately provided, the total height of the transmission becomes high.

It is therefore an object of the present invention to provide an oil passage of a transmission which is capable of effectively utilizing filtered oil, reducing pump intaking work to diminish torque for driving the pump, preventing bubbling of return oil to enhance pump efficiency and to reduce noise, reducing the quantity of oil passing through the filter to attain a small size owing to reduced filter area, and lowering the total height of the transmission to enhance the strength of the transmission.

The present invention preferably includes a transmission having a transmission case comprising at least a first case portion and a second case portion. An oil pump is provided in said first case portion, a valve body being provided at said second case portion and adapted to regulate oil discharged by said oil pump to a predetermined pressure level, said oil pump being provided with a pump manifold, said manifold being provided with a filter adapted to filter oil stored in an oil pan beneath said transmission, an oil intake passage being provided in said pump manifold, a starting end of said oil intake passage being communicated with the interior of said oil pan and a terminating end thereof being communicated with said oil pump through said filter, said pump manifold being provided with an oil feed passage for feeding oil discharged by said oil pump to said valve body, and an oil return passage for returning surplus return oil from said valve body to said oil intake passage on the downstream side of said filter.

According to the preferred construction of the present invention, the pump manifold is provided with the oil feed passage for feeding oil discharged by the oil pump to the valve body and the oil return passage for returning surplus oil from the valve body to the oil intake passage on the downstream side of the filter. Accordingly, the filtered clean return oil can be prevented from being mixed with unfiltered oil, and the clean return oil does not pass through the filter again. Moreover, since the oil feed passage and the oil return passage are both disposed in the pump manifold, the total height of the transmission can be prevented from becoming high, as is caused by conventional separate provision of the oil feed passage and the oil return passage. The first and second case portions of the transmission can be connected with each other through the pump manifold which is provided with the oil feed passage and the oil return passage.

BRIEF DESCRIPTION OF THE DRAWINGS

An embodiment of the present invention will be described in detail with reference to the drawings, in which.

DETAILED DESCRIPTION

Figure 9:
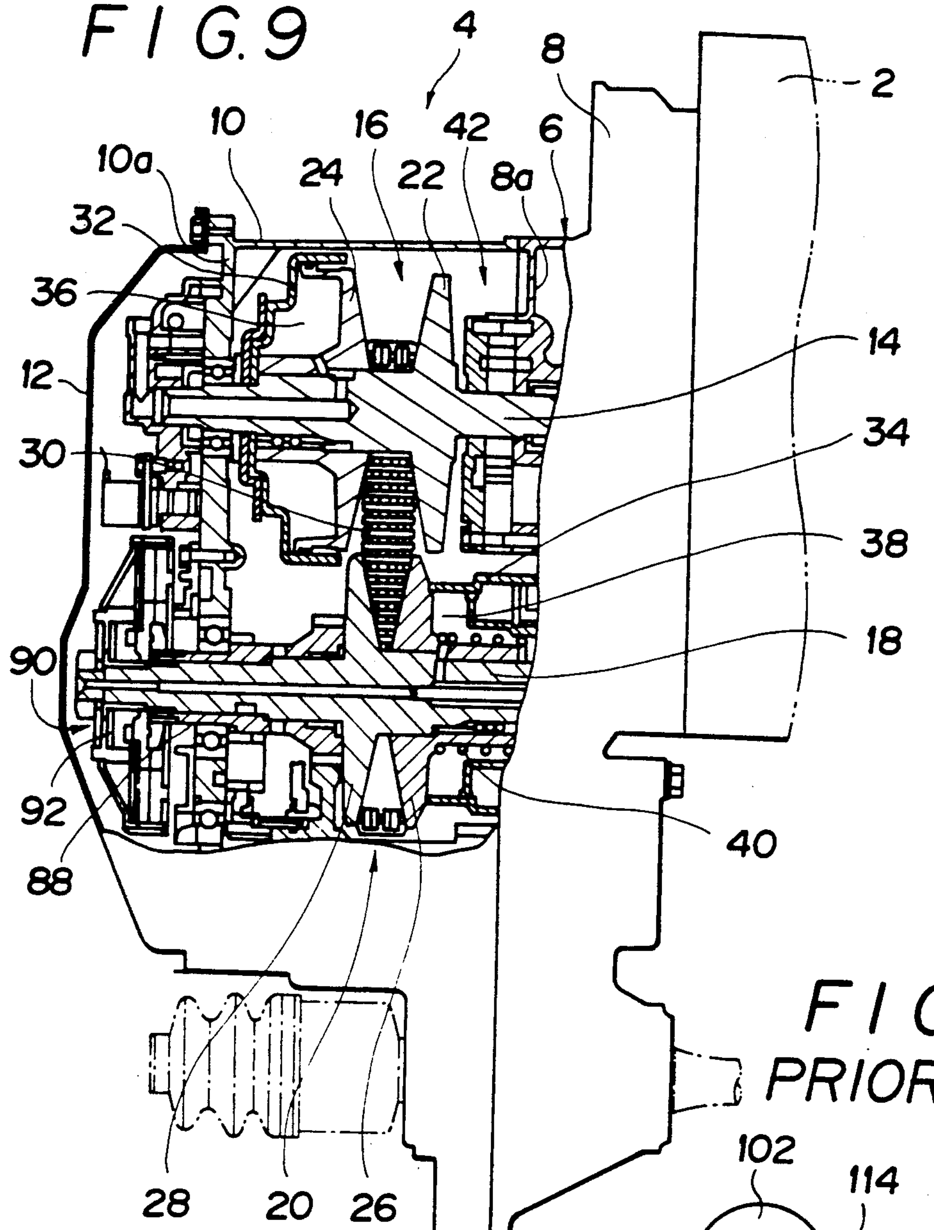
FIG. 9 is a partial sectional view of a belt type transmission according to the invention.
Figure 10:
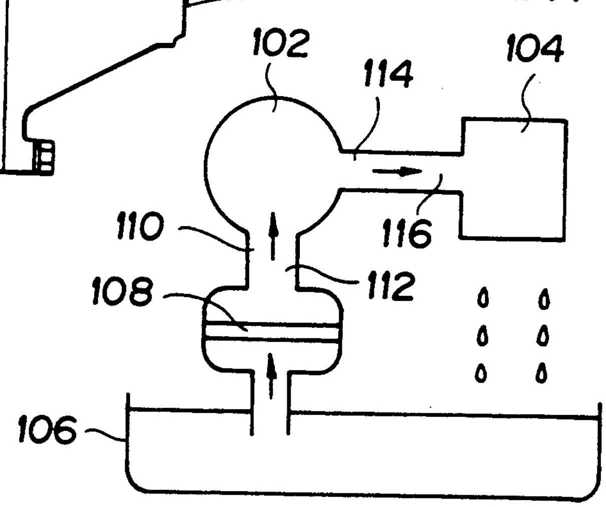
FIG. 10 is a view schematically showing a conventional construction of an oil passage of a conventional transmission.

A belt type transmission, for example, is constructed such as shown in FIG. 9. In FIG. 9, the numeral 2 denotes an engine, and 4 a belt type transmission for taking off driving force of the engine 2 and then converting it to a required form by changing the gear ratio. This transmission 4 has a housing or case 6 which includes at least a first case portion 8 disposed on the side of the engine 2 and a second case portion 10 disposed oppositely across from the engine 2. The transmission 4 also has a side cover 12 mounted on the second case portion 10.

An input side shaft 14 is axially supported on first and second wall portions 8a and 10a of the first and second case portions 8 and 10, and is provided with a driving side pulley 16. Similarly, an output side shaft 18 is axially supported on the first and second wall portions 8a and 10a, and is provided with a driven side pulley 20.

The driving side pulley 16 comprises a driving side pulley element 22 fixed to the input side shaft 14, and a driving side movable pulley element 24 mounted on the shaft 14 such that the pulley element 24 can be moved in the axial direction but cannot be rotated relative to the shaft. The driven side pulley 20 comprises a driven side pulley element 28 fixed to the output side shaft 18 and a driven side movable pulley element 26 mounted on the output side shaft 18 such that the pulley element 26 can be moved in the axial direction but cannot be rotated relative to the shaft.

The driving side pulley 16 and the driven side pulley side 20 have a belt 30 looped therearound.

Mounted respectively on the driving side movable pulley element 24 and the driven side movable pulley element 26 are a driving side housing 32 and a driven side housing 34 which respectively form a driving side hydraulic oil chamber 36 and a driven side hydraulic oil chamber 38. The driven side hydraulic oil chamber 38, in turn, is provided with a spring 40 for urging the driven side movable pulley member 26 in a direction so as to expand the driven side hydraulic oil chamber 38.

Figure 2:
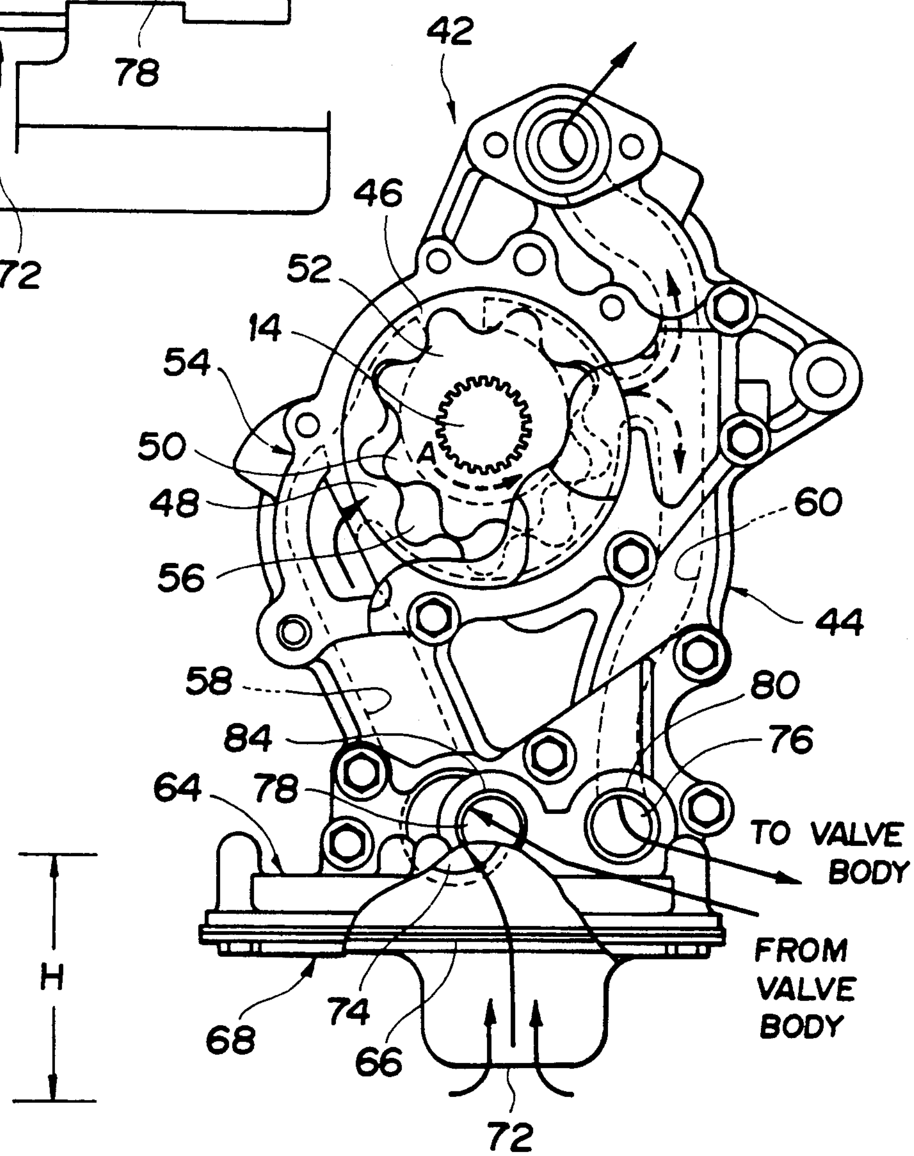
FIG. 2 is a schematic front view of the oil pump of FIG. 1.
Figure 3:
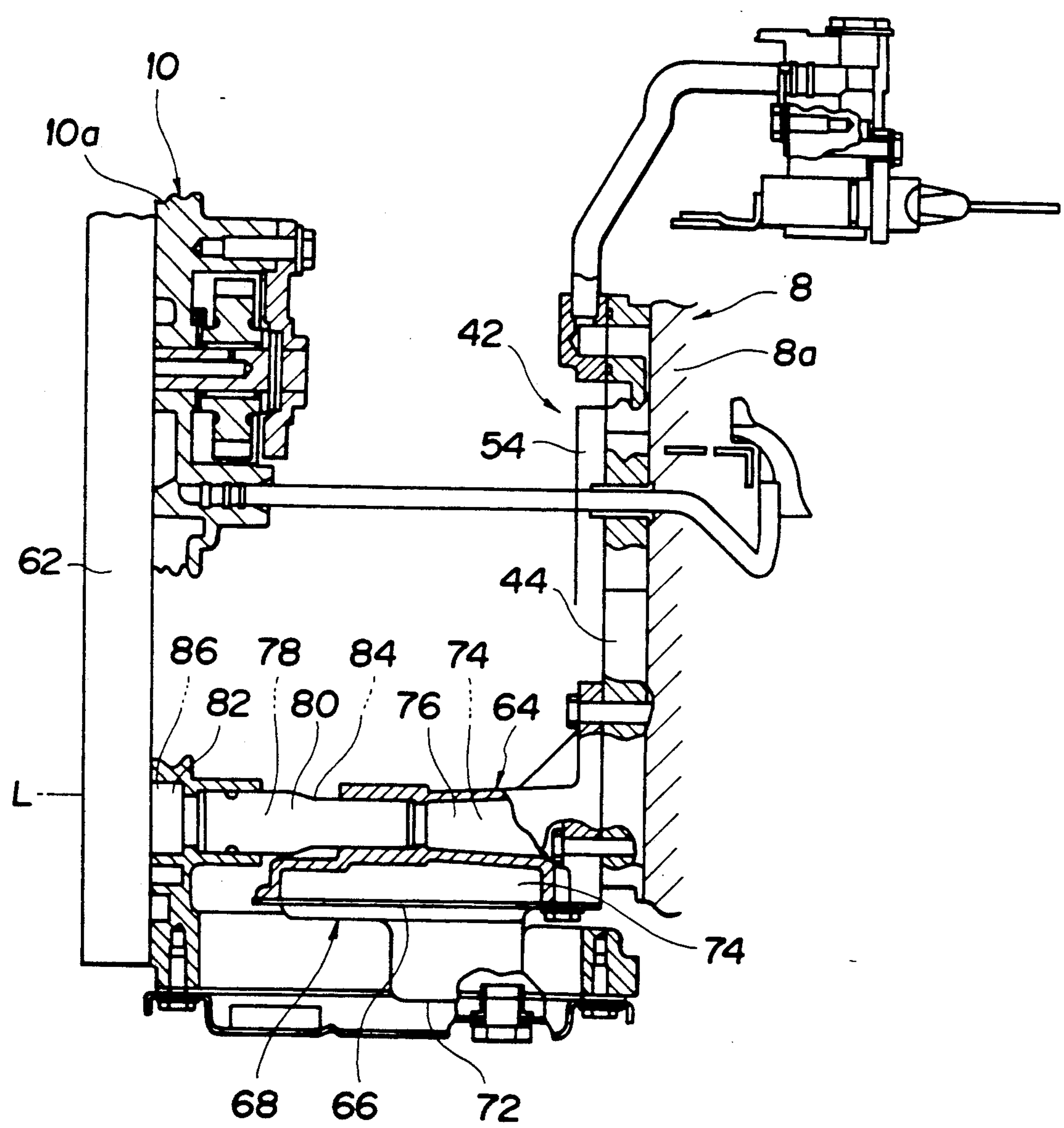
FIG. 3 is a partial sectional view of the pump manifold of FIG. 2.
Figure 4:
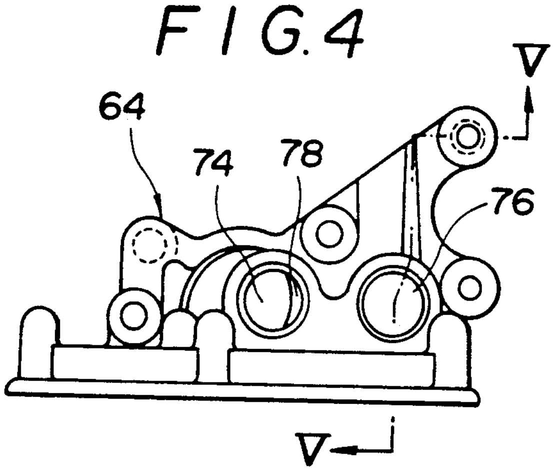
FIG. 4 is a front view of the pump manifold.
Figure 5:
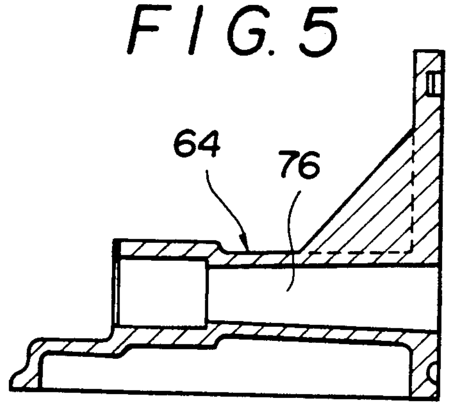
FIG. 5 is a sectional view taken on line V—V of FIG. 4.
Figure 6:
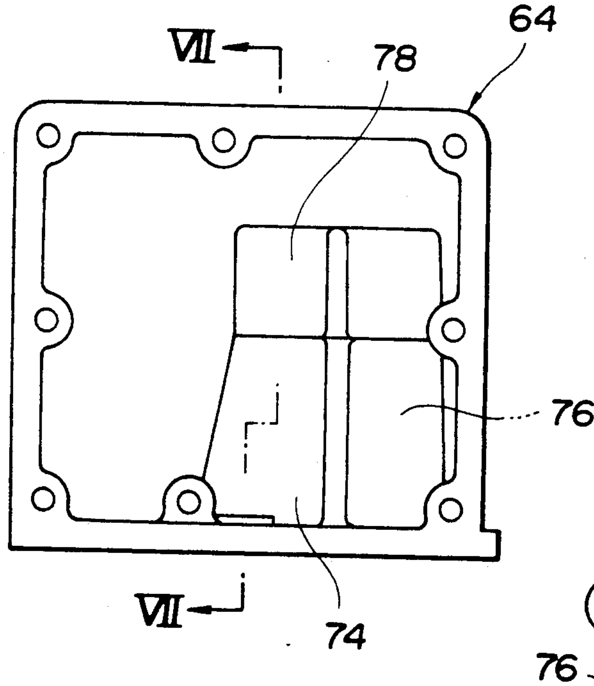
FIG. 6 is a bottom view of the pump manifold.
Figure 7:
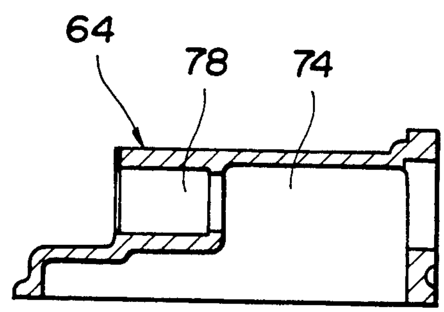
FIG. 7 is a sectional view taken on line VII—VII of FIG. 6 and rotated 90°.
Figure 8:
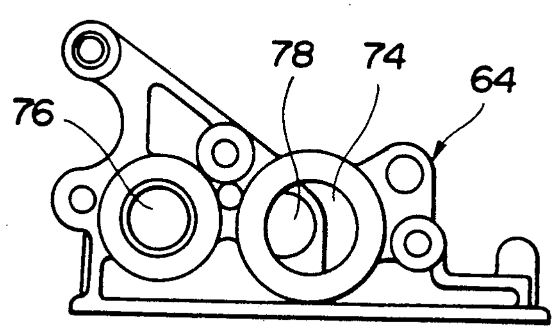
FIG. 8 is a rear view of the pump manifold.

Mounted on the second case portion 10 adjacent the first wall portion 8a is an oil pump 42 as shown in FIGS. 2 and 3. The oil pump 42 comprises a pump housing 44 fixed mounted adjacent the first wall portion 8a of the first case portion 8, an outer rotor 46 rotatably mounted within the pump housing 44, and an inner rotor 52 which is fixed to and rotated by the input side shaft 14. An inner tooth portion 50 of inner rotor 52 is meshed with an outer tooth portion 48 of the outer rotor 46, and a pump cover 54 is mounted on the pump housing 44 in such a manner as to cover the outer rotor 46 and the inner rotor 52. Formed in the pump housing 44 are an intake passage 58 and a discharge passage 60 both communicating with an operating chamber 56 which is formed between the tooth portion 48 of the outer rotor 46 and the tooth portion 50 of the inner rotor 52. As the rotors 46 and 52 rotate, the volume of the operating chamber 56 is repeatedly contracted and expanded.

Also, mounted on the side cover 12 adjacent the second wall portion 10a is a valve body 62 for regulating oil discharged by the oil pump 42 to a predetermined pressure level. The oil pump 42 and the valve body 62 are disposed in generally parallel relation with the first and second case portions 8 and 10 as shown in FIG. 3.

On a lower portion of the pump housing 44 of the oil pump 42, a pump manifold 64 is mounted as shown in FIGS. 2 and 3. Disposed beneath the pump manifold 64 is an oil strainer 68 which is provided with a filter 66 adapted to filter the oil. The oil strainer 68 is located in an oil pan 70 (FIG. 1) disposed beneath the transmission case 6. The reference numeral 72 denotes an oil intake port.

The pump manifold 64 is provided with an oil intake passage 74 which communicates at a starting end thereof with the interior of the oil pan 70 through the filter 66 and intake port 72, and at a terminal end thereof with the intake passage 58 formed in the pump housing 44 of the oil pump 42.

Also, this pump manifold 64, as shown in FIGS. 4 through 8, is provided with an oil feed passage 76 for feeding oil discharged from the oil pump 42 to the valve body 62, and an oil return passage 78 for returning surplus filtered return oil from the valve body 62 to the oil intake passage 74 on the downstream side of the filter 66.

Figure 1:
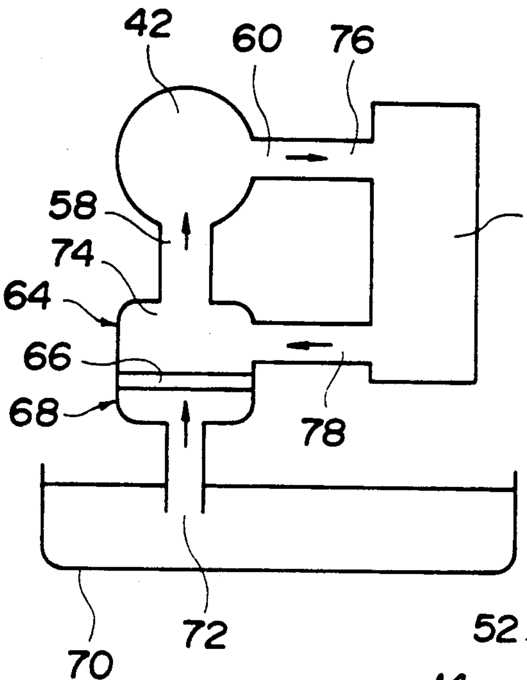
FIG. 1 is a schematic view showing the construction of the oil passage according to the invention.

That is, the oil feed passage 76 communicates at a starting end thereof with the discharge passage 60 of the pump housing 44 and at a terminal end thereof with an oil feed port 82 of the valve body 62 disposed at the second case portion 10 through an oil feed pipe 80. The oil feed passage 76 is disposed in the pump manifold 64 in such a manner as to extend generally perpendicularly between the oil pump 42 and the valve body 62. Also, the oil return passage 78 communicates at a starting end thereof with an oil return portion of the valve body 62 disposed at the second case portion 10 through an oil return pipe 84 and at a terminal end thereof with the oil intake passage 74 on the downstream side of the filter 66. The oil return passage 78 is disposed in such a manner as to be parallel with the oil feed passage 76 on the pump manifold 64. The oil return passage 78, as shown in FIG. 1, communicates with the oil intake passage 74 (upper side of the filter 66 in FIG. 1) on the downstream side of the filter 66.

Owing to the above-mentioned arrangement, the oil feed passage 76 and the oil return passage 78 are disposed in such a manner as to be generally perpendicular to the valve body 62, parallel with each other, and generally horizontal in the pump manifold 64. Also, the pump manifold 64 is connected to the first case portion 8 through the pump housing 44 and to the second case portion 10 through the oil feed pipe 80 and the oil return pipe 84.

Owing to the above-mentioned arrangement, the transmission 4 takes off driving force from the engine 2 in a desired converted form by feeding and discharging oil fed from the oil pump 42 to the drive side hydraulic oil chamber 36 of the drive side pulley 16 and to the driven side hydraulic oil chamber 38 of the driven side pulley 20. The oil supplied by the oil pump 42 is regulated to a predetermined pressure level by the valve body 62 and communicates with the hydraulic chambers 36 and 38 in order to increase or decrease the rotational radius of the belt 30 thereby consecutively to change the gear ratio.

The transmission 4 is provided with a final output shaft 88 which is rotatably engagable with the outer periphery of the output side shaft 18 through a hydraulic clutch 90. This hydraulic clutch 90 continues or discontinues the supply of driving force outputted by the transmission 4 (i.e. engages or disengages the shafts 18 and 88) in response to feeding or discharging oil to and from the clutch hydraulic oil chamber 92.

OPERATION

When the oil pump 42 is actuated by the engine 2, oil in the oil pan 70 is taken into the oil intake passage 74 from the intake port 72 of the oil strainer 68, then taken into the intake passage 58 of the pump housing 44 after being filtered by the filter 66, and then discharged into the discharge passage 60 of the pump housing 44 after being compressed in the operating chambers 56. As discussed above, the rotors 46 and 52 are moved in the rotating direction of the arrow A in FIG. 2 to expand and contract the size of the operating chambers 56.

The oil discharged to the discharge passage 60 is fed to the valve body 62 from the oil feed passage 76 of the pump manifold 64 through the feed pipe 80. In the valve body 62, oil is regulated to a predetermined pressure level and then fed to a required oil feed part, such as driving side hydraulic oil chamber 36. At the same time, surplus clean return oil generated when the oil was regulated to the predetermined pressure level is returned back to the oil return passage 78 through the oil return pipe 84.

Because this oil return passage 78 communicates with the oil intake passage 74 on the downstream side of the filter 66, the clean return oil is not returned to the oil pan 70, but rather to the intake passage 58, from where it is taken into the oil pump 42.

In this way, the pump manifold 64 is provided with the oil feed passage 76 for feeding oil discharged by the oil pump 42 to the valve body 62, and the oil return passage 78 for returning surplus return oil from the valve body 62 to the oil intake passage 74 on the downstream side of the filter 66. Accordingly, the filtrated clean return oil can be prevented from being mixed with the unfiltered oil in the oil pan. Moreover, the clean return oil is not passed through the filter 66 again.

As a consequence, the filtrated oil can be effectively utilized, and, as shown in FIG. 2, the work of drawing clean return oil upward through the distance H can be eliminated and the intake resistance associated with passing the clean return oil through the filter 66 can also be eliminated. Accordingly, the intaking work can be minimized to reduce the torque required for driving the pump. Since the surplus return oil from the valve body 62 is not returned to the oil pan 70, bubbles in the oil pan 70 can be prevented. As a result, pump efficiency is enhanced and noise is reduced. Furthermore, the quantity of oil passing through the filter 66 is obviously reduced. As a consequence, the filter area can be reduced to attain a small size.

Moreover, because the oil feed passage 76 for feeding oil to the valve body 62 from the oil pump 42 and the return oil passage 78 for returning the surplus return oil from the valve body 62 are disposed on the pump manifold 64 in parallel and horizontal relation with each other, the total height of the transmission can be reduced below that of the conventional structure wherein the oil feed passage and the oil return passage are separately disposed. Since the total height can be lowered, and because the first and second case portions 8 and 10 of the transmission case 10 are connected through the pump housing 44, the oil feed pipe 80, the oil return pipe 84, and the pump manifold 64 which is provided with the oil feed passage 76 and the oil return passage 78, the structural strength of the transmission case can be increased.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A transmission having a case provided with first and second generally parallel and vertically extending case walls, an oil pump discharged by said oil pump to a predetermined pressure level and including a valve body mounted on said second case wall, said oil pump being provided with a pump manifold and a filter for filtering oil removed by said oil pump from an oil pan located beneath the transmission, said manifold including an oil intake passage which connects said oil pump to said oil pan and which permits oil to be drawn therethrough from said oil pan into said oil pump, said oil intake passage having a starting end which communicates with the interior of the oil pan and a terminating end which communicates with the oil pump, said filter being disposed in said oil intake passage downstream of said starting end and said oil pan, the manifold also including an oil feed passage for feeding oil discharged by said oil pump to said valve body and an oil return passage for returning surplus return oil from said valve body into said oil intake passage downstream of said filter, said oil feed passage and said oil return passage being respectively defined interiorly of first and second pipes which extend generally in parallel and horizontal relationship and which respectively have opposite ends thereof fixedly joined to said pump and said valve body.

2. A transmission according to claim 1, wherein said first and second pipes are disposed in sidewardly spaced relation and at an elevation above the filter.

* * * * *

UNITED STATES PATENT AND TRADEMARK OFFICE

CERTIFICATE OF CORRECTION

PATENT NO. : 5,091,078

DATED : February 25, 1992

INVENTOR(S) : Masahiro Ogawa

It is certified that error appears in the above-indentified patent and that said Letters Patent is hereby corrected as shown below:

Column 6, line 26; after "an oil pump" insert ---mounted on said first case wall, a valve means for regulating oil---.

Signed and Sealed this

Twenty-ninth Day of June, 1993

Attest:

Michael K. Kirk

MICHAEL K. KIRK

*Attesting Officer*

*Acting Commissioner of Patents and Trademarks*